United States Patent
Kaneda (10) Patent No.: US 9,164,709 B2
(45) Date of Patent: Oct. 20, 2015

(54) PRINTING APPARATUS AND CONTROL METHOD THEREOF

(75) Inventor: Takeshi Kaneda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 235 days.

(21) Appl. No.: 13/160,315

(22) Filed: Jun. 14, 2011

(65) Prior Publication Data

US 2011/0317208 A1    Dec. 29, 2011

(30) Foreign Application Priority Data

Jun. 29, 2010 (JP) .................................. 2010-148023
Jun. 6, 2011 (JP) .................................. 2011-126256

(51) Int. Cl.
G06K 15/00 (2006.01)
G06F 3/12 (2006.01)
G06K 15/02 (2006.01)
H04N 1/00 (2006.01)

(52) U.S. Cl.
CPC ............ *G06F 3/1212* (2013.01); *G06F 3/1247* (2013.01); *G06F 3/1285* (2013.01); *G06K 15/02* (2013.01); *G06K 15/186* (2013.01); *G06K 15/1823* (2013.01)

(58) Field of Classification Search
CPC ... G06F 3/1212; G06F 3/1247; G06F 3/1285; G06F 3/1296–3/1298; G06K 15/186; G06K 15/02; G06K 15/1823; G06K 15/1822; H04N 1/40062
USPC ........... 358/1.1, 1.9, 2.1, 1.11–1.18, 504, 406
See application file for complete search history.

(56) References Cited

U.S. PATENT DOCUMENTS

| 5,132,719 A * | 7/1992 | Kioka et al. .................... 355/24 |
| 7,986,895 B2 | 7/2011 | Tsujita |
| 8,125,665 B2 | 2/2012 | Miyahara |
| 8,469,353 B2 | 6/2013 | Unno |
| 2002/0135797 A1* | 9/2002 | Al-Kazily et al. ........... 358/1.15 |

(Continued)

FOREIGN PATENT DOCUMENTS

| CN | 101315718 A | 12/2008 |
| CN | 101470376 A | 7/2009 |
| CN | 101620391 A | 1/2010 |
| CN | 101676819 A | 3/2010 |
| JP | 11-151837 A | 6/1999 |
| JP | 2003-296070 A | 10/2003 |
| JP | 2008-23785 A | 2/2008 |
| JP | 2008269261 A | 11/2008 |

OTHER PUBLICATIONS

Chinese Office Action in corresponding Chinese Patent Application No. 201110185089.X dated Jun. 28, 2013.

*Primary Examiner* — Chad Dickerson
(74) *Attorney, Agent, or Firm* — Fitzpatrick, Cella, Harper & Scinto (57) ABSTRACT

This invention provides a mechanism of preventing the stop of a print operation caused by a delay, from print processing, of processing of generating image data from print data. To accomplish this, a printing apparatus includes a receiving unit which receives print data containing a plurality of page sets for each of which different post-processing can be designated, and pages contained in the plurality of page sets, an analysis unit which analyzes a page contained in print data received by the receiving unit, and a print control unit which starts printing when the number of pages analyzed by the analysis unit is equal to or larger than a predetermined number, and restricts the start of printing when the number of pages analyzed by the analysis unit is smaller than the predetermined number.

15 Claims, 8 Drawing Sheets

(56) References Cited

U.S. PATENT DOCUMENTS

| | | |
|---|---|---|
| 2003/0056177 A1* | 3/2003 | Nara et al. .................. 715/525 |
| 2003/0159114 A1 | 8/2003 | Nishikawa et al. |
| 2004/0114170 A1* | 6/2004 | Christiansen et al. ....... 358/1.13 |
| 2005/0219602 A1 | 10/2005 | Mikami |
| 2008/0239380 A1* | 10/2008 | Takahashi ................ 358/1.15 |
| 2009/0086264 A1* | 4/2009 | Yoshida .................... 358/1.15 |
| 2009/0244118 A1 | 10/2009 | Kakutani |
| 2010/0067036 A1 | 3/2010 | Oka |
| 2010/0091323 A1* | 4/2010 | Sunada et al. ............. 358/1.15 |
| 2010/0110483 A1* | 5/2010 | Igarashi ..................... 358/1.15 |
| 2010/0278546 A1* | 11/2010 | Korfanta ....................... 399/24 |

\* cited by examiner

PRINTING APPARATUS AND CONTROL METHOD THEREOF

BACKGROUND OF THE INVENTION

1. Field of the Invention

The present invention relates to a printing apparatus, control method thereof, and program.

2. Description of the Related Art

There has conventionally been a database which manages a plurality of addresses and a plurality of names separately for respective records. Some printing apparatuses print records managed by such a database on separate sheets. This enables easy printing of the address of a material to be distributed for each record.

For example, Japanese Patent Laid-Open No. 2008-269261 discloses a technique of generating a job to print data of each field contained in each of a plurality of records in a predetermined region of a sheet, transmitting the job to a printing apparatus, and thereby printing.

The above-mentioned printing is implemented using exceptional page settings of the PostScript language, manufacturer-specific extended specifications, and the like.

An external apparatus such as a PC generates a print job using the PostScript language, and transmits it to a printing apparatus. The printing apparatus receives the print job transmitted from the external apparatus, interprets the received print job, and prints in accordance with print settings and finishing settings designated in the print job.

Recently, it has become necessary to use sheets of different types for respective records and execute different finishing processes for respective records. For example, a printed material to be distributed to address A is finished by stapling plain sheets, while one to be distributed to address B is finished by punching coated sheets.

In this situation, the printing apparatus needs to receive a print job from an external apparatus, and successively print on sheets while interpreting the sheet types and finishing settings of respective records designated by the print job. In this case, the printing apparatus detects, as a page set, the delimiter of a record contained in print data of the job, and executes different finishing processes for the respective detected page sets.

However, the PostScript language becomes less versatile when information indicating a record delimiter is embedded in a field other than each page data. To maintain versatility, information indicating a record delimiter needs to be embedded in each page data. Thus, when the printing apparatus detects during analysis of a page that this page is the start page of a page set, it interrupts the analysis of the page, and sets information indicating that this page is the start page of the page set. After setting the page set, the printing apparatus analyzes the page again. Since the printing apparatus needs to analyze the page again after setting a new page set, processing of generating page image data delays. As a result of the delay of the process of generating image data, no image can be applied to an image transfer member for transferring an image, sheet conveyance stops, and heat stays because no sheet passes through the fixing unit. Once the temperature rises abruptly due to the stay of heat, printing cannot be maintained with a stable quality.

SUMMARY OF THE INVENTION

The present invention has been made to solve the above problems. The present invention provides a mechanism of suppressing degradation of the print quality caused by a delay of the process of generating image data from print data containing a plurality of page sets.

According to first aspect of the invention, there is provided a printing apparatus comprising: a receiving unit which receives print data containing a plurality of page sets for each of which different processing can be designated, and pages contained in the plurality of page sets; an analysis unit which analyzes a page contained in print data received by the receiving unit; and a print control unit which starts printing when the number of pages analyzed by the analysis unit is not smaller than a predetermined number, and restricts a start of printing when the number of pages analyzed by the analysis unit is smaller than the predetermined number.

According to second aspect of the invention, there is provided a printing apparatus comprising: a receiving unit which receives print data containing a plurality of page sets for each of which different processing can be designated, and pages contained in the plurality of page sets; an analysis unit which analyzes a page set contained in print data received by the receiving unit; and a print control unit which starts printing when the number of page sets analyzed by the analysis unit is not smaller than a predetermined number, and restricts a start of printing when the number of page sets analyzed by the analysis unit is smaller than the predetermined number.

According to third aspect of the invention, there is provided a printing apparatus control method comprising: a receiving step of receiving print data containing a plurality of page sets for each of which different processing can be designated, and pages contained in the plurality of page sets; an analysis step of analyzing a page contained in print data received in the receiving step; and a print control step of controlling to start printing when the number of pages analyzed in the analysis step is not larger than a predetermined number, and inhibit a start of printing when the number of pages analyzed in the analysis step is smaller than the predetermined number.

The present invention can suppress degradation of the print quality caused by a delay of the process of generating image data from print data containing a plurality of page sets.

Further features of the present invention will become apparent from the following description of exemplary embodiments (with reference to the attached drawings).

DESCRIPTION OF THE EMBODIMENTS

Preferred embodiments of the present invention will be described in detail below with reference to the accompanying drawings. It should be understood that the following embodiments are not intended to limit the scope of the appended claims, and that not all combinations of features set forth in the embodiments are indispensable for the means of solution in the present invention.

[Overall Configuration of Printing System (FIG. 1)]

Figure 1:
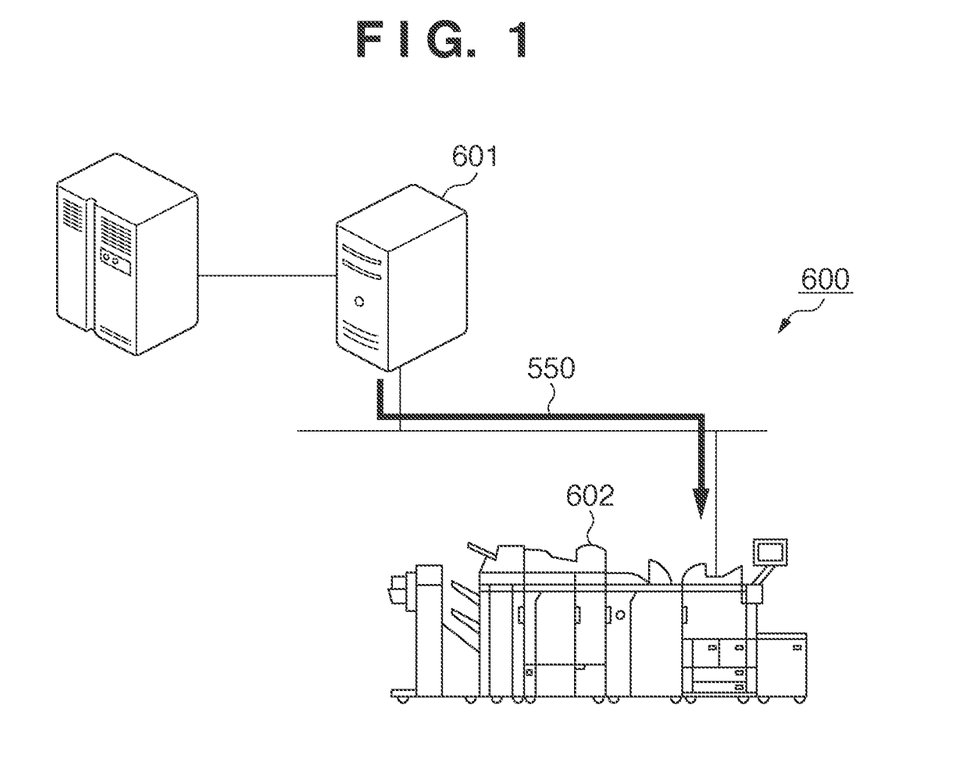
FIG. 1 is a view showing the overall configuration of a printing system according to an embodiment of the present invention.

FIG. 1 is a view showing the overall configuration of a printing system 600 according to an embodiment.

The printing system 600 includes a host PC 601 serving as an example of an external apparatus which generates print data, a printing apparatus 602 (image forming apparatus) which receives print data and prints, and a finishing apparatus which performs finishing processing (post-processing) for printed sheets. The host PC 601 is connected to the printing apparatus 602 via a network.

The host PC 601 extracts a record such as an address book in a database connected to the host PC 601 in accordance with a user instruction, and converts it into PostScript (to be simply referred to as PS) print data. This address book contains the name and address of each customer. Data extraction from the database and conversion into PS are successively done. The host PC 601 transmits PS stream data 550 (PDL data) to the printing apparatus 602. At this time, the host PC 601 generates a page set formed from print data of pages to undergo the same finishing processing, and generates and outputs a job made up of one or more page sets. The number of page sets contained in one job depends on the number of finishing processes. In designation of finishing processing, for example, the user displays a record extracted from the database on the screen of the host PC 601, and designates post-processing to be executed for each record via a setting screen such as a printer driver. Examples of the post-processing are punching processing, stapling processing, folding processing, insertion processing, and shift processing. Post-processing need not always be designated for each record, and some records may not have a post-processing designation. When transmission of print data is designated with such designation, the host PC 601 generates print data converted into a page set of one or more pages. The host PC 601 generates a job by adding the setting of the post-processing designated for a record. The host PC 601 transmits the generated job to the printing apparatus 602. The PDL data described here may be configured to be able to designate the use of a different type of sheet (printing medium) for each record.

The printing apparatus 602 receives a job from the host PC 601, analyzes the received job, converts print data in the job into image data, and prints an image on a sheet in accordance with the image data. The printing apparatus 602 controls the finishing apparatus via an interface to execute, for printed sheets, post-processing designated for each page set. As for a record having no post-processing designation, the printing apparatus 602 discharges a printed sheet onto the discharge tray of the finishing apparatus on which no special processing is done. The discharged output result will be explained later with reference to FIG. 6.

[Configuration of Printing Apparatus 602]

(Hardware Configuration (FIG. 2A))

Figure 2A:
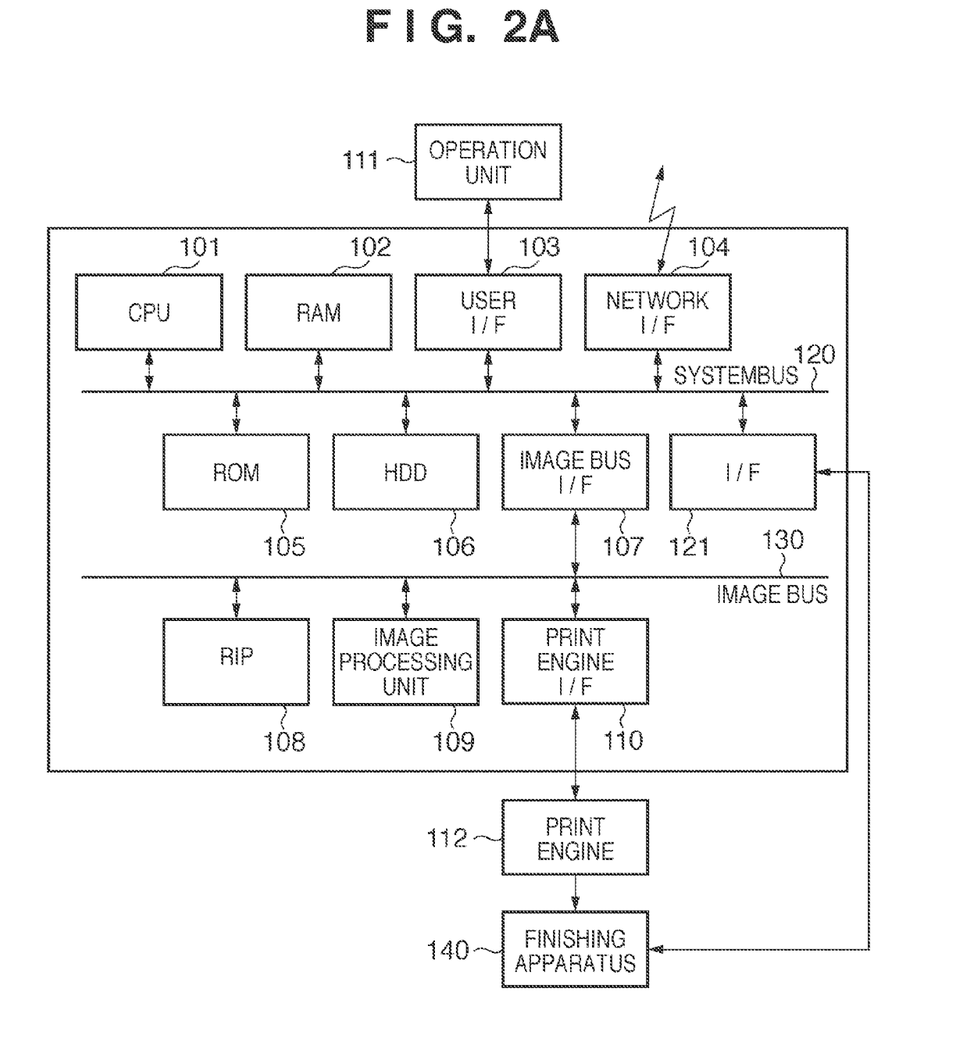
FIGS. 2A and 2B are block diagrams showing the hardware and software configurations of the printing apparatus.

FIG. 2A is a block diagram showing the hardware configuration of the printing apparatus.

The printing apparatus 602 includes a CPU 101, RAM 102, user I/F 103, network I/F 104, ROM 105, and HDD 106. These units are connected to each other via a system bus 120 and can communicate with each other.

The CPU 101 comprehensively controls the printing apparatus 602. The RAM 102 functions as the work area of the CPU 101. The ROM 105 stores various programs to be read out by the CPU 101.

The CPU 101 can access, via an image bus I/F 107, a RIP (Rater Image Processor) 108, image processing unit 109, and print engine I/F 110 which are connected to an image bus 130.

Further, software programs such as a print job control unit 203, PDL analysis unit 205, and print control unit 209 (to be described later) run on the CPU 101, and the RAM 102 holds temporal data during processing. The CPU 101 controls even a finishing apparatus 140 via an interface 121.

The user I/F 103 is connected to an operation unit 111, and notifies each module of a signal from the operation unit 111. The network I/F 104 receives PDL data from the printing host PC 601 via a network, and stores it in the HDD 106. The HDD 106 temporarily stores PDL data received via the network, and is accessed from each module as a data swap area for the RIP 108 and image processing unit 109.

The image bus I/F 107 interfaces with the system bus 120 and image bus 130 of the printing apparatus 602. The image bus I/F 107 controls communication between the system bus 120 on which control system software runs, and modules pertaining to page image processing that run on the image bus 130. The RIP 108 connected to the image bus 130 develops a page description language (PDL) code into an image file. The image processing unit 109 performs resolution conversion processing and correction processing suited to a print engine 112 for an image file generated by the RIP 108. The print engine I/F 110 is a communication I/F used when the print control unit 209 controls the print engine 112 via a print engine I/F 210.

(Software Configuration (FIG. 2B))

Figure 2B:
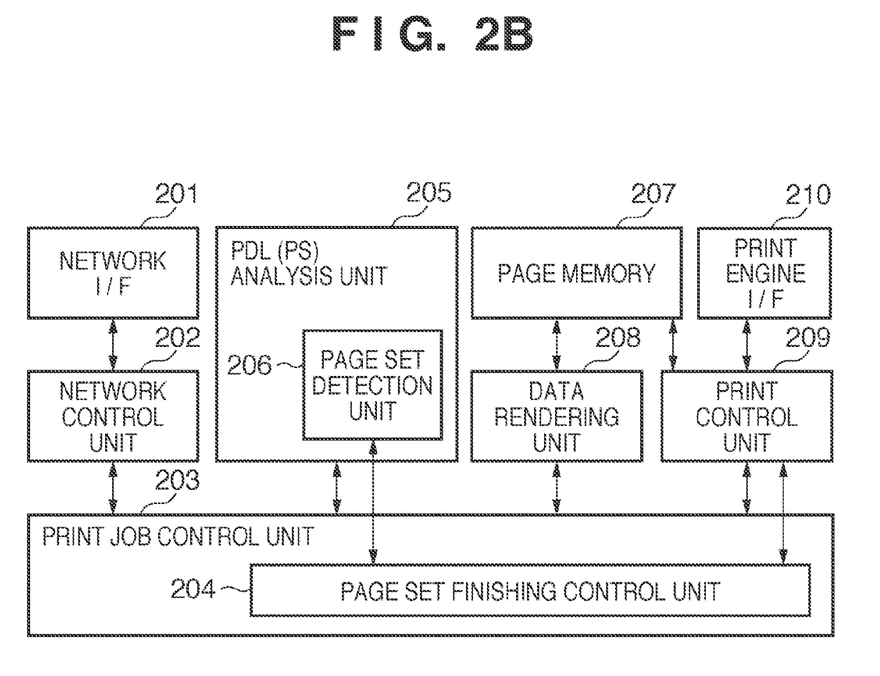

FIG. 2B is a block diagram schematically showing a software configuration in the printing apparatus 602. A network control unit 202, the print job control unit 203, and a page set finishing control unit 204 shown in FIG. 2B are implemented by reading out and executing programs stored in the ROM 105 by the CPU 101. Similarly, the PDL (PS) analysis unit 205, a page set detection unit 206, a data rendering unit 208, and the print control unit 209 are implemented by reading out and executing programs stored in the ROM 105 by the CPU 101.

A network I/F 201 provides a TCP/IP socket I/F to the network control unit 202. An application which generates PDL data of many pages in the printing host PC 601 transmits PS format data by either the RAW or LPR data transfer protocol. LPR stands for Line PRinter daemon protocol.

In the printing apparatus 602, the network control unit 202 copes with the RAW/LPR communication protocol, receives a print job formed from PS data, and sequentially writes it as stream data in the HDD 106. The print job control unit 203 recognizes the start of receiving a print job by the network control unit 202, and internally starts print job processing for the print job. A detailed print job processing sequence will be described with reference to FIG. 3. The print job control unit 203 activates the PDL analysis unit 205. The PDL analysis unit 205 reads out PS data accumulated in the HDD 106, and executes analysis processing.

More specifically, the PDL analysis unit 205 develops PS data read out from the HDD 106. The page set detection unit 206 detects an extended command embedded in PS rendering information, and recognizes it as sheet feed/discharge destination designation and finishing designation for each record. The page set finishing control unit 204 of the print job control unit 203 is notified of these kinds of page set information. The notified information includes the start page ID of a record bundle, and designation of various finishing conditions such as stapling processing and punching processing for each record.

The data rendering unit 208 invokes the RIP 108 and image processing unit 109 to convert PS data into an image file optimum for the print engine 112, and spools the image file in the HDD 106 via a page memory 207. The print control unit 209 sequentially transfers optimum image files in the HDD 106 to the print engine 112 via the print engine I/F 210. The printing apparatus 602 prints in accordance with a large amount of record data received from the printing host PC 601, and controls the finishing apparatus 140 to execute finishing processing.

Implementation of finishing processing for each record with respect to a large amount of record data requires management of record delimiter information. Next, detection of the delimiter and overhead generated in page management for each record will be explained.

[Change of Record Information Management Status (FIG. 3)]

Figure 3:
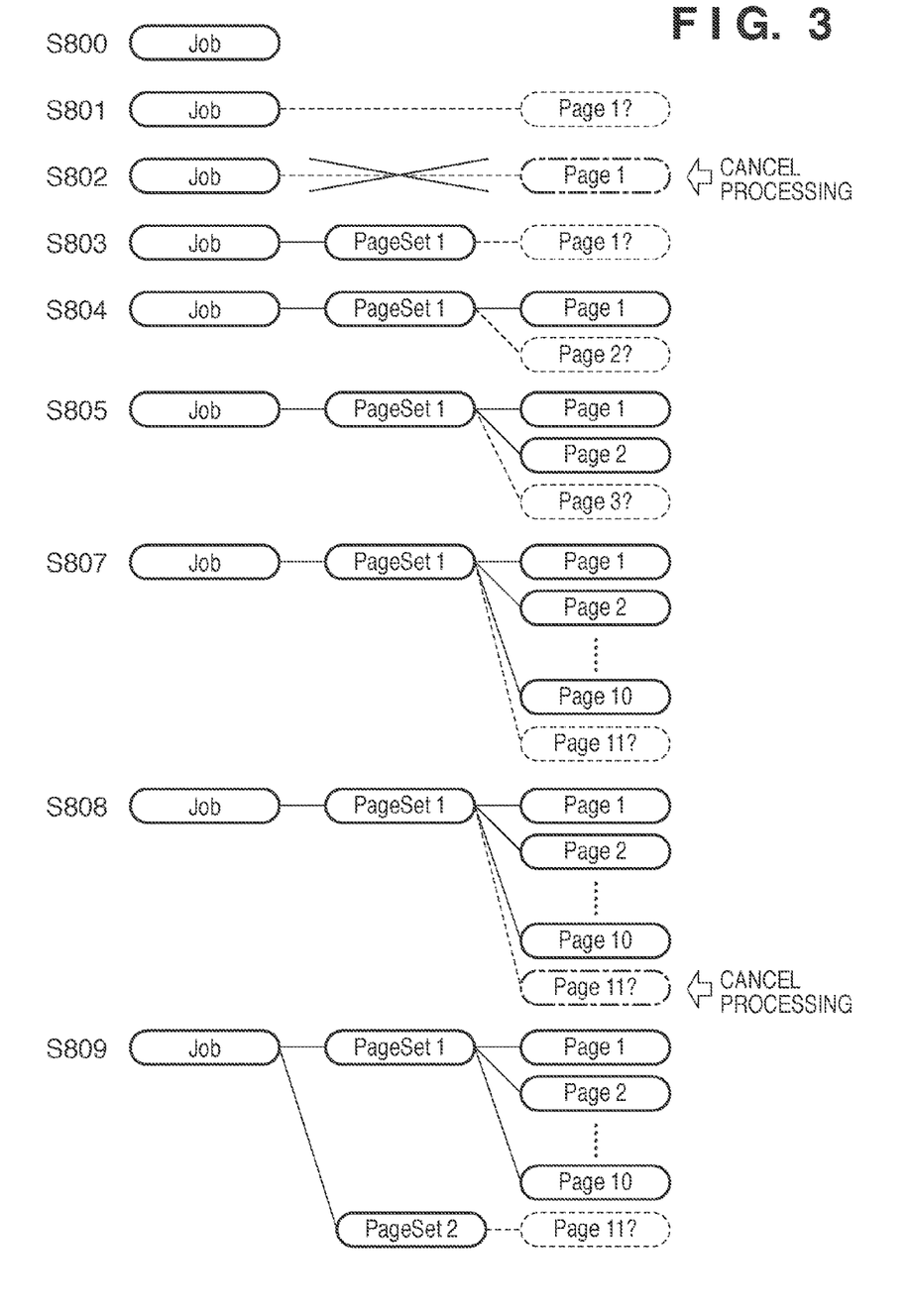
FIG. 3 is a chart showing a change of the record information management status.

FIG. 3 shows a change of record information when the printing apparatus 602 receives PS data (see FIG. 5) from the host PC 601 and analyzes the received PS data. The CPU 101 manages this record information in the HDD 106.

In general, the page layer follows the print job layer, and a job and page have parentage (step S801). When the job does not contain a page set, the CPU 101 develops the job page data and then controls the print engine 112 to print in accordance with the developed data. When analyzing print data containing a page set, the CPU 101 sets information between a job and a page to indicate the page set, generating an intermediate layer for managing the page for each page set. Upon completion of developing all page sets and pages, the CPU 101 controls the print engine 112 to print in accordance with the page data.

At the start of print job processing, the CPU 101 of the printing apparatus 602 cannot determine whether print data contained in a received job is data containing a page set. This is because information indicating a record delimiter is embedded in data of each page to maintain versatility of PostScript data. If information indicating a record delimiter is embedded in a field other than data of each page, versatility is impaired such that a display application cannot display an image data preview. Information embedded in page data is detected only after the CPU 101 analyzes the page data. That is, before analyzing print data, the CPU 101 cannot determine whether print data to be printed in a received job is predetermined print data which contains a plurality of page sets and can designate different post-processes for the respective page sets.

In steps S800 and S801, therefore, PDL data is internally held on the premise of "no page set".

When the CPU 101 detects page set information before the start page, it cancels the internal structure stored in the HDD 106 (step S802), and reconstructs the structure in the form of job→page set 1→page 1 (step S803). After that, the CPU 101 controls the PDL analysis unit 205 so that PS page development processing precedes up to step S807 on the premise that page 2 and subsequent pages follow page set 1.

In step S807, the CPU 101 detects page set information embedded in the middle of the data of page 11 during development processing for page 11, and detects that page 11 belongs not to page set 1 but to page set 2. Hence, the CPU 101 cancels the relationship between page set 1 and page 11 that has been prepared ahead (step S808), and constructs the relationship between page set 2 and page 11 (step S809).

If the number of pages of the entire job and the page range of each page set can be finalized at the time of receiving the job, processing can proceed without performing such cancel processing. However, the number of pages of the entire print job and the page range of each page set cannot be finalized till the end of job analysis. If the start of printing is inhibited till the end of job analysis when the number of pages of a print job is large, the print start timing delays. In a case in which the print job contains several thousand or tens of thousands of pages and the number of pages differs between page sets, all data cannot be accumulated in the printing spool area of the HDD 106.

As described above, in handling a print job having a page set, no page set delimiter can be detected till the end of page analysis. To finalize the range of a page set on one preceding page and generate a new page set, it is necessary to cancel information of a page during analysis and analyze the page again, which generates processing overhead. A time lag for managing the page set structure leads to an image data generation delay, and image data generation processing cannot catch up with print processing. As a result of the delay of processing of generating image data, no image can be applied to an image transfer member for transferring an image, sheet conveyance stops, and heat stays because no sheet passes through the fixing unit. Once the temperature rises abruptly due to the stay of heat, printing cannot be maintained with stable quality. To solve this, according to the embodiment, when print data received by the printing apparatus is one capable of designating different processing for each page set, printing does not start until a predetermined number or more of pages are analyzed, and printing starts on condition that a predetermined number or more of pages are analyzed. This prevents the stop of a print operation owing to the delay of the image data generation time after the start of printing. This processing will be explained below.

[Overall Processing Sequence of Printing Apparatus (FIG. 4)]

Figure 4:
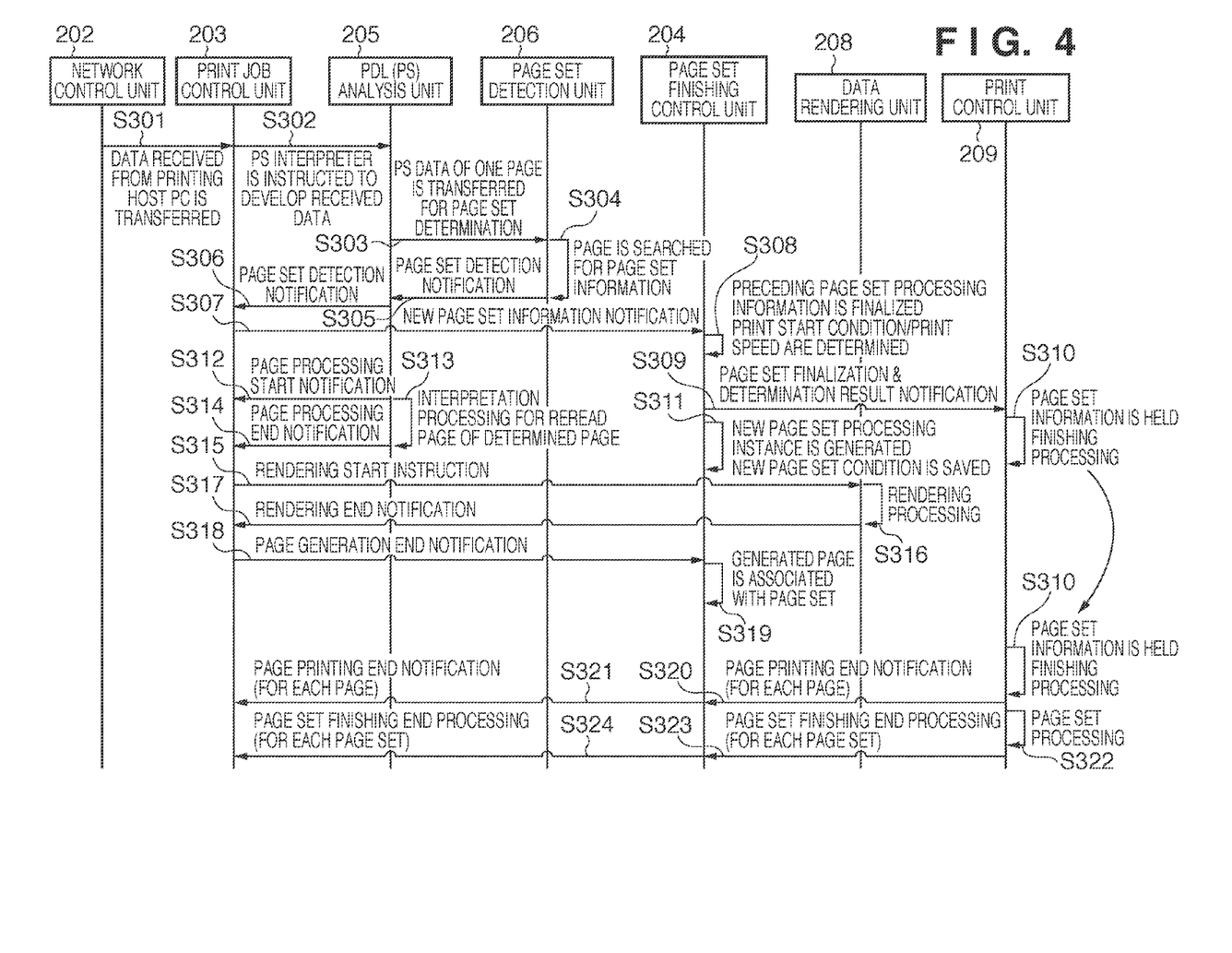
FIG. 4 is a flowchart showing the overall processing sequence of the printing apparatus.

FIG. 4 is a sequence chart showing processing in the printing apparatus.

The network control unit 202, print job control unit 203, PDL analysis unit 205, and print control unit 209 perform the page set detection sequence.

The network control unit 202 of the printing apparatus 602 receives print job data which is transmitted from the host PC 601 and formed from record data in the PostScript format. The network control unit 202 sequentially writes the received print job data in the HDD 106, and notifies the print job control unit 203 of the reception of the print job (step S301).

The print job control unit 203 detects the start of receiving PS data from this notification, and starts print job processing. More specifically, the print job control unit 203 internally generates an instance for job management. The print job control unit 203 generates an instance for page set management below the job management instance, associates them with each other, and instructs the PDL analysis unit 205 to develop a PS file (step S302).

In steps S303 to S314, PS data development processing is executed based on the instruction from the print job control unit 203. The PDL analysis unit 205 transfers PS data of one page to the page set detection unit 206 for page set determination (step S303). The page set detection unit 206 determines whether the page data contains a page set start notification (information indicating the start of a page set) serving as a record delimiter, and information about finishing designation for each page set (step S304).

The page set detection unit 206 notifies the PDL analysis unit 205 of the determination result (step S305), and the PDL analysis unit 205 notifies the print job control unit 203 of the determination result (step S306). If the PDL analysis unit 205 does not receive the page set detection notification in step S305, the print job is a normal print job containing no page set, and the PDL analysis unit 205 notifies the print job control unit 203 of the start of page processing (step S312). In this case, the print job control unit 203 controls the data rendering unit 208 to start page development. The print control unit 209 starts printing on condition that the development of the first page has ended. After that, the data rendering unit 208 advances page development processing, and controls the print control unit 209 to print sequentially from the developed pages.

If the print job control unit 203 receives the page set detection notification in step S306, processes in steps S307 to S311 upon page set detection are executed. If a record delimiter position in the PS data is detected as a result of determination by the page set detection unit 206, the print job control unit 203 notifies the page set finishing control unit 204 of new page set information (step S307).

Upon receiving the new page set information, the page set finishing control unit 204 recognizes pages up to a preceding one as one record, and finalizes a page set finishing instruction corresponding to page bundle information of each page set (step S308). Based on information about the number of analyzed pages spooled in the HDD, the page set finishing control unit 204 determines whether to start print processing. The page set finishing control unit 204 determines the print speed after the start of printing. Note that the detailed processing sequence in step S308 will be described later with reference to FIG. 5.

If the page set finishing control unit 204 determines in step S308 to start print processing, it notifies the print control unit 209 of page set information and the determination result indicating the start of printing (step S309). If the page set finishing control unit 204 determines not to start print processing, it notifies the print control unit 209 of the determination result indicating no start of printing. If the print control unit 209 receives the notification of the determination result indicating the start of printing, it starts printing of each record and post-processing designated for each record. If the print control unit 209 receives the notification of the determination result indicating no start of printing, it adds the analyzed data to the print queue list for each page set without starting printing.

The page set finishing control unit 204 generates an instance for processing the next page set detected in step S304, and saves the page set condition detected in step S304 in the HDD 106 (step S311).

The PDL analysis unit 205 notifies the print job control unit 203 to develop the PS data and start page interpretation processing (step S312), and performs the page interpretation processing (step S313). At the end of this processing, the PDL analysis unit 205 notifies the print job control unit 203 of the end (step S314).

If the print job control unit 203 receives the page interpretation processing end notification from the PDL analysis unit 205, it instructs the data rendering unit 208 to start rendering processing for converting the image into data optimum for the print engine 112 (step S315). Upon receiving this instruction, the data rendering unit 208 performs rendering processing (step S316), and at the end of this processing, notifies the print job control unit 203 of the end (step S317).

Every time the page set finishing control unit 204 receives a page generation end notification from the print job control unit 203 (step S318), it associates the developed page as a child page of the new page set (step S319).

If the print control unit 209 receives in step S309 the notification of the determination result indicating the start of printing from the page set finishing control unit 204, it starts printing from the start page, and performs a series of processes up to finishing (step S310). Every time printing of each page and each page set ends, the print control unit 209 notifies the page set finishing control unit 204 of a message to this effect (steps S320 and S323). This notification is used in the determination processing in step S308, and this processing is indispensable. Upon receiving the notification, the page set finishing control unit 204 sends the same notification to the print job control unit 203 (steps S321 and S324).

[Detailed Processing Sequence of Print Start Condition Determination Processing (step S308) (FIG. 5)]

Figure 5:
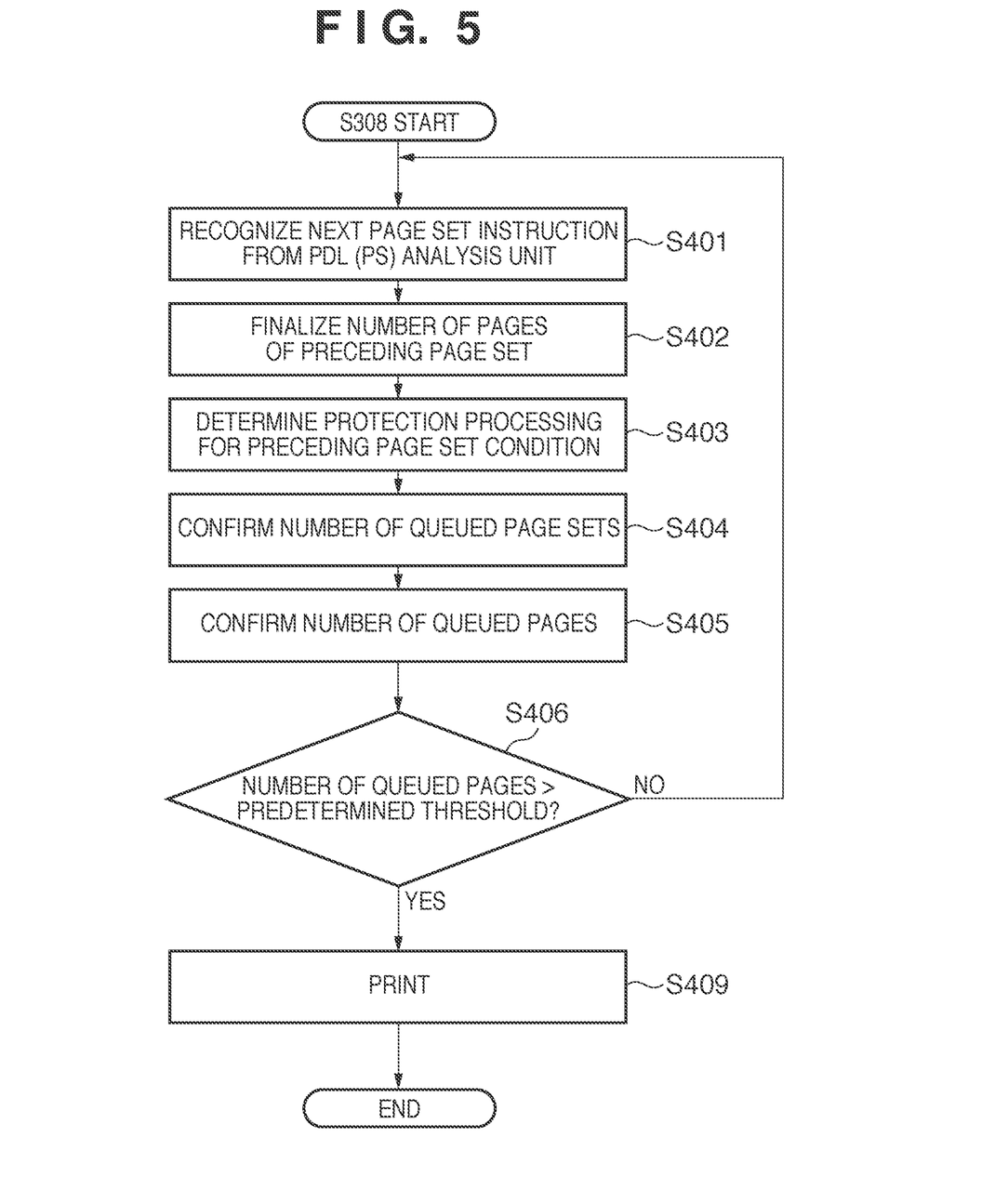
FIG. 5 is a flowchart showing the detailed processing sequence of print start condition determination processing (step S308)

The page set finishing control unit 204 executes a sequence shown in FIG. 5. That is, the CPU 101 implements this sequence by reading out and executing a program stored in the ROM 105.

If the page set finishing control unit 204 receives a new page set detection notification (step S307) from the PDL analysis unit 205, it recognizes the next page set start instruction (step S401). That is, the page set finishing control unit 204 recognizes that a preceding page set has ended by a preceding page. Since one page set is finalized by the preceding page, the page set finishing control unit 204 calculates and finalizes information in the page set (for example, the number of pages) (step S402).

Based on the finalized number of pages, the page set finishing control unit 204 determines whether a page set finishing instruction designated in PS data is executable (step S403). For example, when punching processing is designated as a page set finishing instruction and the number of pages has exceeded the number of punchable sheets, the punching processing instruction is invalidated (protection processing in the printing apparatus).

The page set finishing control unit 204 then counts the number of queued page sets spooled in the printing apparatus (step S404). At this time, the previous count result is held separately in the memory, and stored so that the page set finishing control unit 204 can identify the count result in determination processing of step S406. Similar to step S404, the page set finishing control unit 204 counts the number of queued pages spooled in the printing apparatus without issuing a print instruction to the print control unit 209 (suspend) (step S405). The HDD 106 holds the number of counted pages.

Thereafter, the page set finishing control unit 204 determines whether the number of queued pages (number of analyzed pages) has exceeded a predetermined threshold (step S406). The predetermined threshold can be the number of sheets retainable on the conveyance path of the print engine 112 (maximum number of simultaneously conveyable sheets of the sheet conveyance path) in printing. The printing apparatus 602 can execute retained printing to feed sheets by the number of retainable sheets at predetermined intervals, and print while retaining these sheets on the conveyance path of the printing apparatus 602. The number of retainable sheets can be a predetermined number (for example, three or four) as a printing apparatus setting regardless of the sheet size.

When printing print data containing no page set, the speed to feed one sheet for printing is lower than that of processing of generating 1-page data, so printing may start immediately after the end of generating the first page data. However, when page data generation processing takes time, for example, when print data contains a plurality of page sets, preparation of image data may delay. In such a case, the printing apparatus has to interrupt printing, and the print engine runs idle. At this time, if image data of pages to be printed on sheets have been spooled by the number of retainable sheets, the printing apparatus 602 can continue retained printing. Thus, the page set finishing control unit 204 of the printing apparatus 602 according to the embodiment determines in step S406 whether the number of queued pages (number of analyzed pages) has exceeded a predetermined threshold (for example, number of retainable sheets). This determination can prevent the stop of a print operation caused by the time taken to switch the page set in printing.

If the number of queued pages has exceeded the predetermined threshold, no delay occurs in readout of the next page from the print engine 112. Hence, the page set finishing control unit 204 advances the process to step S409 to determine that printing can start. After that, the process returns to the sequence of FIG. 4, and the page set finishing control unit 204 notifies the print control unit 209 of the determination result and controls it to start printing. If the number of queued pages has not exceeded the predetermined threshold, generation of image data may not catch up with the speed of the print engine 112, interrupting printing. The page set finishing control unit 204 therefore does not determine that printing can start, and returns to step S401. That is, printing may be interrupted, so the page set finishing control unit 204 restricts the start of printing. When data are queued by the number of pages exceeding the predetermined threshold, the page set finishing control unit 204 instructs the print control unit 209 to start printing, and the print control unit 209 prints.

In this manner, the print start timing is changed between received print data which contains a plurality of page sets for each of which different type of processing is designated, and print data containing no page set. More specifically, when printing in accordance with print data containing no page set, it is determined that printing can start at the timing when analysis of 1-page data has ended, and printing starts sequentially from developed pages without executing the processing shown in FIG. 5. To the contrary, when printing in accordance with print data containing a plurality of page sets for each of which different type of processing is designated, printing does not start until the number of analyzed pages becomes equal to or larger than a predetermined threshold, and printing starts on condition that the number of analyzed pages becomes equal to or larger than the predetermined threshold. This can prevent the stop of a print operation caused by a delay of image data generation processing.

[Finishing Instruction and Output Example of PS Transaction Data (FIGS. 6 and 7)]

Figure 6:
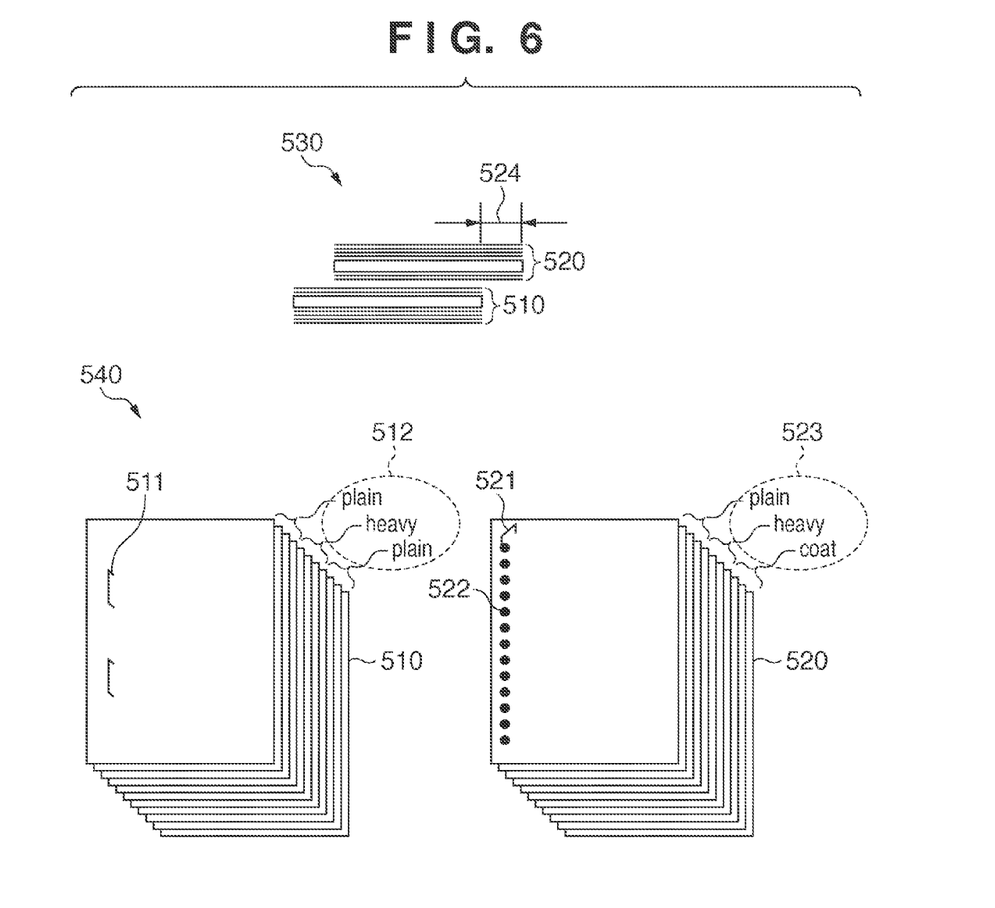
FIG. 6 is a view showing the structure of PostScript page data.
Figure 7:
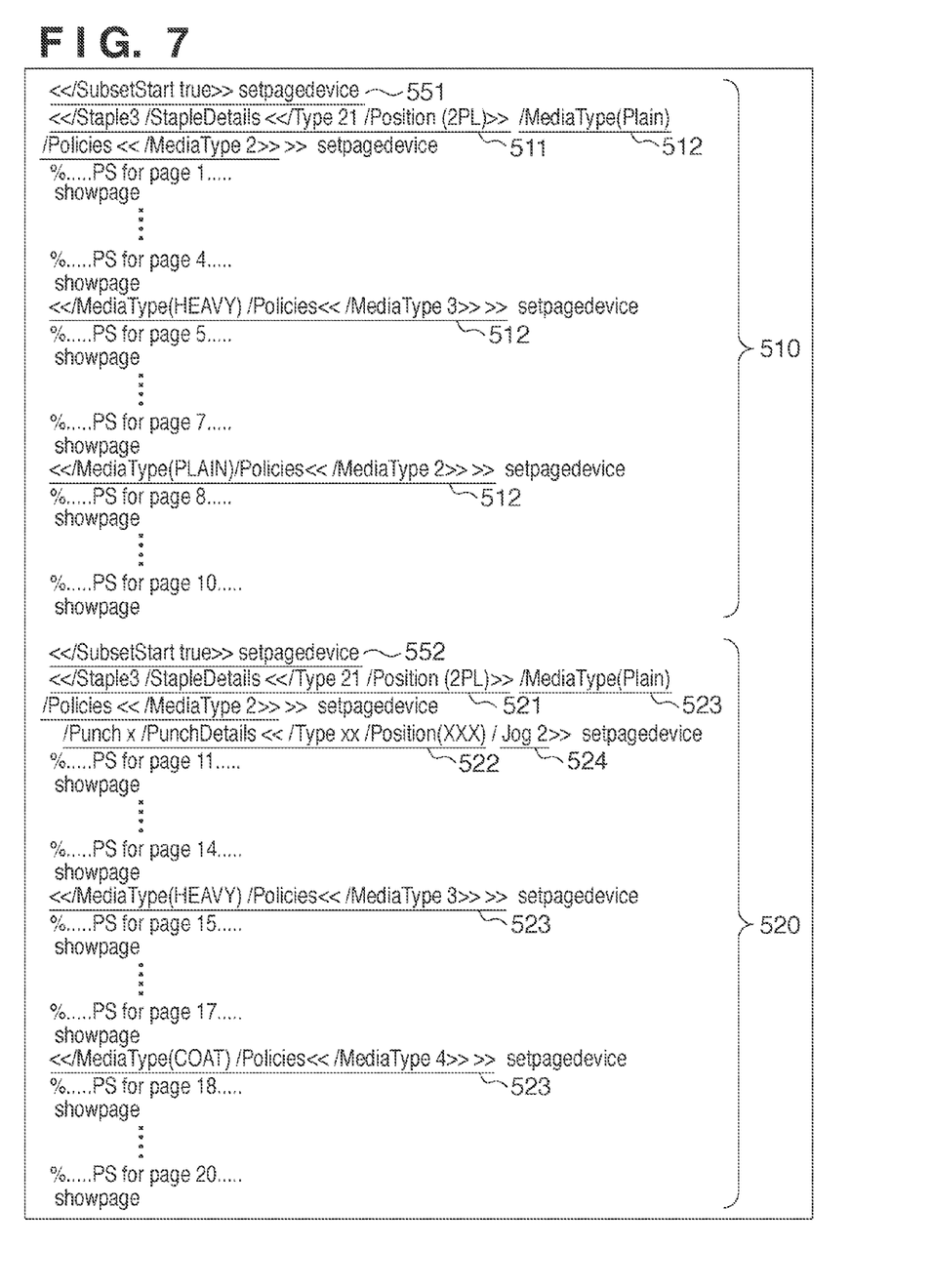
FIG. 7 is a view showing page set/page processing.

In FIG. 6, reference numeral 530 denotes a stacking status on the discharge tray of the printing apparatus; and 540, details of each page set contained in a job on the discharge tray. In FIG. 7, PS commands for implementing the output results 530 and 540 will be explained in association with the individual results 530 and 540.

For a page set 510, stapling processing 511 indicating double stitching, and switching 512 of printing media to plain paper→heavy paper→plain paper are performed. For a page set 520, upper-left single stitching 521 as stapling processing, punching processing 522 on the left side of sheets, switching 523 of printing media to plain paper→heavy paper→coated paper, and shift processing 524 in discharge onto the discharge tray are done.

The starts of page sets in PS data are detected based on tags 551 and 552 in FIG. 7. The PDL analysis unit 205 receives PS stream data shown in FIG. 7, and analyzes it while sequentially storing it in the memory. First, the PDL analysis unit 205 detects the tag 551 indicating the start of a page set, and notifies the page set finishing control unit 204 of the stapling processing 511 serving as a finishing instruction necessary to process the page set and the medium switching 512. As for the medium switching 512, the page set finishing control unit 204 is notified of switching properly at the timing of each page processing, and processing continues up to page 10.

When processing page 11, the PDL analysis unit 205 detects the delimiter information 552 indicating the start of the next page set, and similarly notifies the page set finishing control unit 204 of the start of the page set. Upon receiving the next page set start notification, the page set finishing control unit 204 finalizes processing information of the preceding page set and executes determination processing to determine the operation contents of the print control unit 209 in steps S308 to S311. The pieces of page set start information 551 and 552 serve as page set information event triggers in steps S305, S306, and S307. The page set processing information finalized in step S308 includes two for the page set 510, that is, the stapling processing 511 and medium switching 512, and four for the page set 520, that is, the stapling processing 521, punching processing 522, medium switching 523, and shift processing 524. In addition to them, folding processing or insertion processing can also be designated as finishing processing.

As described above, according to the embodiment, images which are stored in the page image buffer and are to be transferred to the print engine by the start of printing after data reception can be ensured by an appropriate number of pages.

After the start of printing, the page set finishing control unit 204 may confirm a change of the number of queued pages in every predetermined time. When the number of queued pages decreases, the page set finishing control unit 204 may instruct the print control unit 209 to decrease the engine print speed. When images stored in the page image buffer run short, interruption of a conveyed sheet can be prevented by adjusting the print speed in advance.

In step S406 of the above-described embodiment, the page set finishing control unit 204 determines whether the number of queued pages has exceeded a predetermined threshold. In step S406, the page set finishing control unit 204 may determine whether the number of queued page sets (number of bundles) is equal to or larger than a predetermined threshold. This is because, when the number of queued page sets has exceeded the predetermined threshold, for example, even if one page set contains only one page, it can be guaranteed that data to be printed are saved in the HDD 106 by a number indicated by the threshold. This determination can prevent the stop of a print operation due to the time taken to switch the page set in printing.

Functions described in the flowcharts of the embodiment can be implemented even by executing software (program) acquired via a network or various storage media by a processing apparatus (CPU or processor) such as a personal computer.

[Other Embodiments]

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2010-148023, filed Jun. 29, 2010 and 2011-

126256, filed Jun. 6, 2011, which are hereby incorporated by reference herein in their entirety.

What is claimed is:

1. A printing apparatus comprising:
a receiving unit that receives print data;
an analysis unit that analyzes each page included in a single reception of the received print data;
a determining unit that determines whether a plurality of page sets are included in the single reception of the received print data or no page sets are included in the single reception of the received print data, wherein different sheet processes can be designated to each of the a plurality of page sets;
a control unit that controls, based on a result of a determination by the determining unit, (i) not to start printing of the received print data until a predetermined number which is more than one of pages included in the single reception of the received print data are analyzed by the analysis unit and to start printing of the received print data after the predetermined number of pages included in the received print data are analyzed by the analysis unit in a case where it is determined that the plurality of page sets are included in the single reception of the received print data, and (ii) to start printing of the received print data before the predetermined number of pages included in the single reception of the received print data are analyzed by the analysis unit in a case where it is determined that no page sets are included in the single reception of the received print data.

2. The printing apparatus according to claim 1, wherein the control unit controls to start printing of the received print data in response that first one page included in the received print data is analyzed by the analysis unit in a case where it is determined that the at least one page set is plurality of page sets are not included in the received print data.

3. The printing apparatus according to claim 1, wherein the determination unit performs the determination based on a result of the analysis by the analysis unit.

4. The printing apparatus according to claim 1, wherein the analysis unit analyzes, when information for delimiting a page set is detected in an analyzed page, the page again.

5. The printing apparatus according to claim 1, wherein the sheet processes includes at least one of punching process, stapling process, folding process, insertion process, shift process.

6. The printing apparatus according to claim 1, wherein the received print data is generated by referencing a database that manages information including name or address for each customer.

7. A printing apparatus comprising:
a receiving unit that receives print data;
an analysis unit that analyzes each page included in a single reception of the received print data;
a determining unit that determines whether a plurality of page sets are included in the single reception of the received print data or no page sets are included in the single reception of the received print data, wherein different sheet processes can be designated to each of the a plurality of page sets;
a control unit that controls, based on a result of a determination by the determining unit, (i) not to start printing of the received print data until pages in a predetermined number which is more than one of page sets included in the single reception of the received print data are analyzed by the analysis unit and to start printing of the received print data after pages in the predetermined number of page sets included in the received print data in a case where it is determined that the plurality of page sets are included in the single reception of the received print data, and (ii) to start printing of the received print data in response that first one page included in the single reception of the received print data is analyzed by the analysis unit in a case where it is determined that no page sets are included in the single reception of the received print data.

8. The printing apparatus according to claim 7, wherein the determination unit performs the determination based on a result of the analysis by the analysis unit.

9. The printing apparatus according to claim 7, wherein the analysis unit analyzes, when information for delimiting a page set is detected in an analyzed page, the page again.

10. The printing apparatus according to claim 7, wherein the sheet processes includes at least one of punching process, stapling process, folding process, insertion process, shift process.

11. The printing apparatus according to claim 7, wherein the received print data is generated by referencing a database that manages information including name or address for each customer.

12. A method for controlling a printing apparatus, the method comprising the steps of:
receiving print data;
analyzing each page included in a single reception of the received print data;
determining whether a plurality of page sets are included in the single reception of the received print data or no page sets are included in the single reception of the received print data, wherein different sheet processes can be designated to each of the a plurality of page sets;
controlling, based on a result of the determination in the determining step, (i) not to start printing of the received print data until a predetermined number which is more than one of pages included in the single reception of the received print data are analyzed and to start printing of the received print data after the predetermined number of pages included in the received print data are analyzed in a case where it is determined that the plurality of page sets are included in the single reception of the received print data, and (ii) to start printing of the received print data before the predetermined number of pages included in the single reception of the received print data are analyzed in a case where it is determined that no page sets are included in the single reception of the received print data.

13. A method for controlling a printing apparatus, the method comprising the steps of:
receiving print data;
analyzing each page included in a single reception of the received print data;
determining whether a plurality of page sets are included in the single reception of the received print data or no page sets are included in the single reception of the received print data, wherein different sheet processes can be designated to each of the a plurality of page sets;
controlling, based on a result of the determination in the determining step, (i) not to start printing of the received print data until pages in a predetermined number which is more than one of page sets included in the single reception of the received print data are analyzed and to start printing of the received print data after pages in the predetermined number of page sets included in the received print data in a case where it is determined that the plurality of page sets are included in the single reception of the received print data, and (ii) to start printing of the received print data in response that first one page included in the single reception of the received print data is analyzed in a case where it is determined that no page sets are included in the single reception of the received print data.

14. A non-transitory computer-readable storage medium storing a program for causing a computer to execute a control method for controlling a printing apparatus, the method comprising the steps of:

receiving print data;

analyzing each page included in a single reception of the received print data;

determining whether a plurality of page sets are included in the single reception of the received print data or no page sets are included in the single reception of the received print data, wherein different sheet processes can be designated to each of the a plurality of page set; and controlling, based on a result of the determination in the determining step, (i) not to start printing of the received print data until a predetermined number which is more than one of pages included in the single reception of the received print data are analyzed and to start printing of the received print data after the predetermined number of pages included in the received print data are analyzed in a case where it is determined that the plurality of page sets are included in the single reception of the received print data, and (ii) to start printing of the received print data before the predetermined number of pages included in the single reception of the received print data are analyzed in a case where it is determined that no page sets are included in the single reception of the received print data.

15. A non-transitory computer-readable storage medium storing a program for causing a computer to execute a control method for controlling a printing apparatus, the method comprising the steps of:

receiving print data;

analyzing each page included in a single reception of the received print data;

determining whether a plurality of page sets are included in the single reception of the received print data or no page sets are included in the single reception of the received print data, wherein different sheet processes can be designated to each of the a plurality of page set; and controlling, based on a result of the determination in the determining step, (i) not to start printing of the received print data until pages in a predetermined number which is more than one of page sets included in the received print data are analyzed and to start printing of the single reception of the received print data after pages in the predetermined number of page sets included in the received print data in a case where it is determined that the plurality of page sets are included in the single reception of the received print data, and (ii) to start printing of the received print data in response that first one page included in the single reception of the received print data is analyzed in a case where it is determined that no page sets are included in the single reception of the received print data.

\* \* \* \* \*